Figure 16:
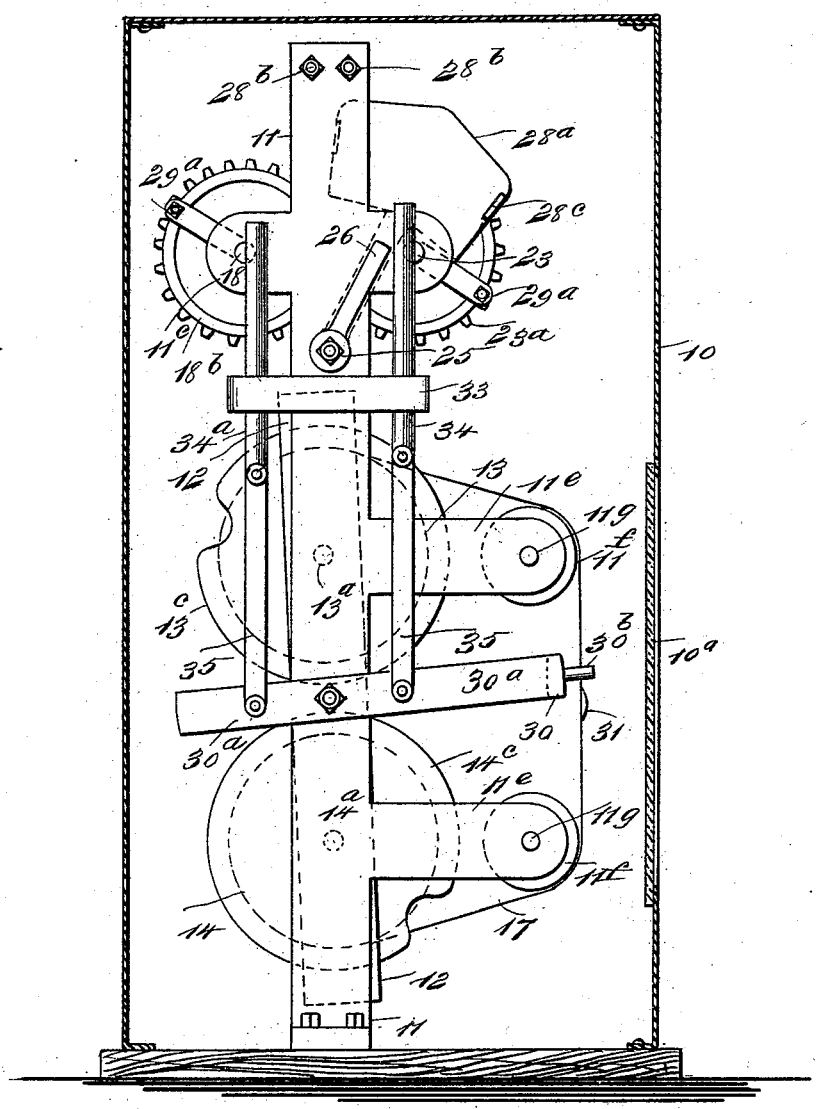

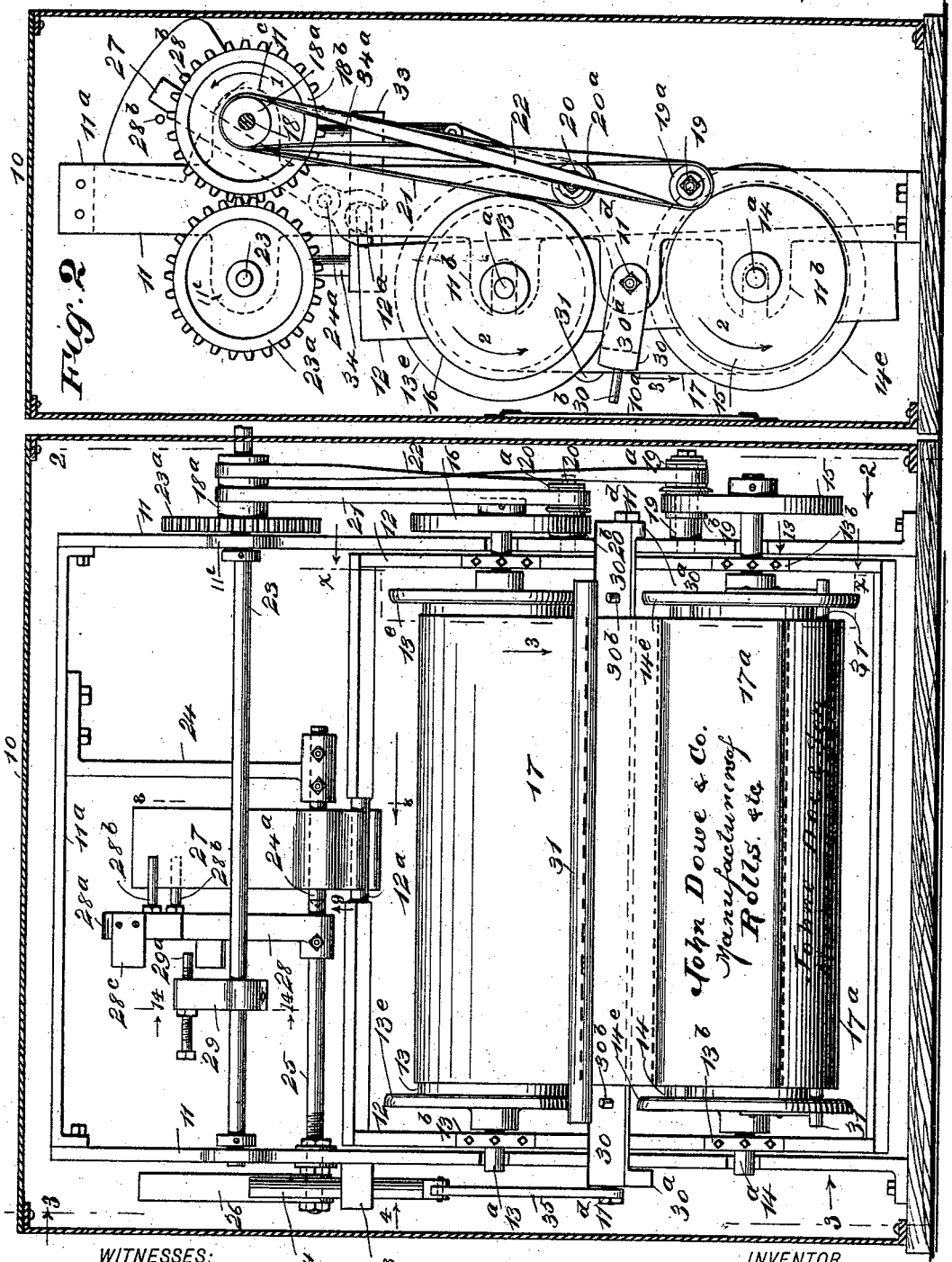
(No Model.)  5 Sheets—Sheet 1.
W. T. SHIRLEY.
ADVERTISING MACHINE.
No. 528,814.  Patented Nov. 6, 1894.
WITNESSES:
Joshua Bergstrom
Wm P. Patton
INVENTOR
W. T. Shirley
BY Munn & Co.
ATTORNEYS.

(No Model.) 5 Sheets—Sheet 2.
W. T. SHIRLEY.
ADVERTISING MACHINE.
No. 528,814. Patented Nov. 6, 1894.
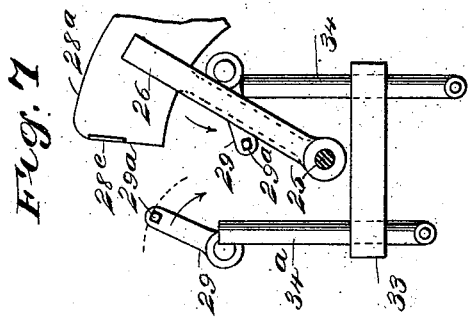
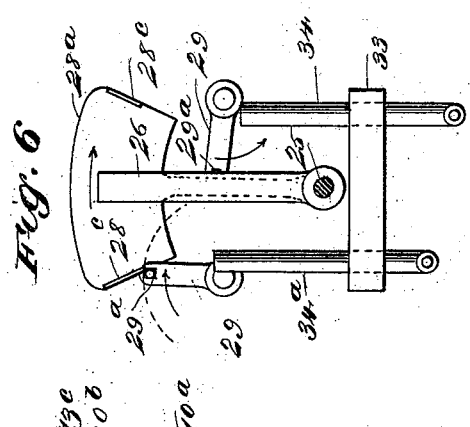
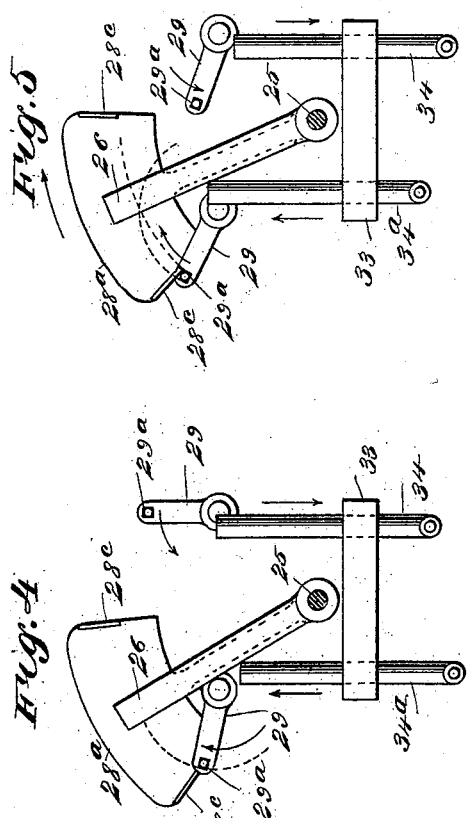
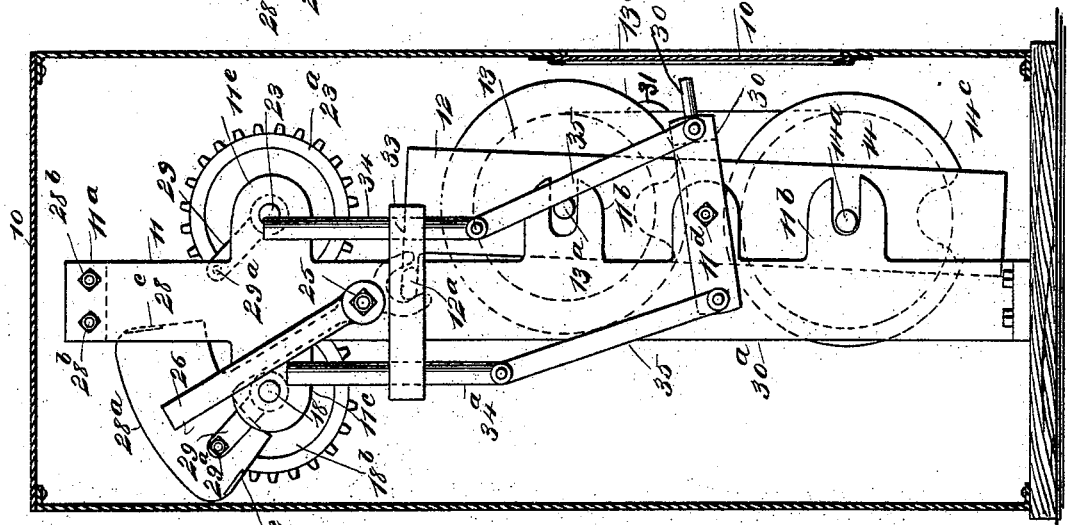
WITNESSES:
Joshua Bingham
Wm P. Patton
INVENTOR
W. T. Shirley
BY
Munn & Co.
ATTORNEYS.
THE NORRIS PETERS CO., PHOTO-LITHO., WASHINGTON, D. C.

(No Model.) 5 Sheets—Sheet 3.
W. T. SHIRLEY.
ADVERTISING MACHINE.
No. 528,814. Patented Nov. 6, 1894.
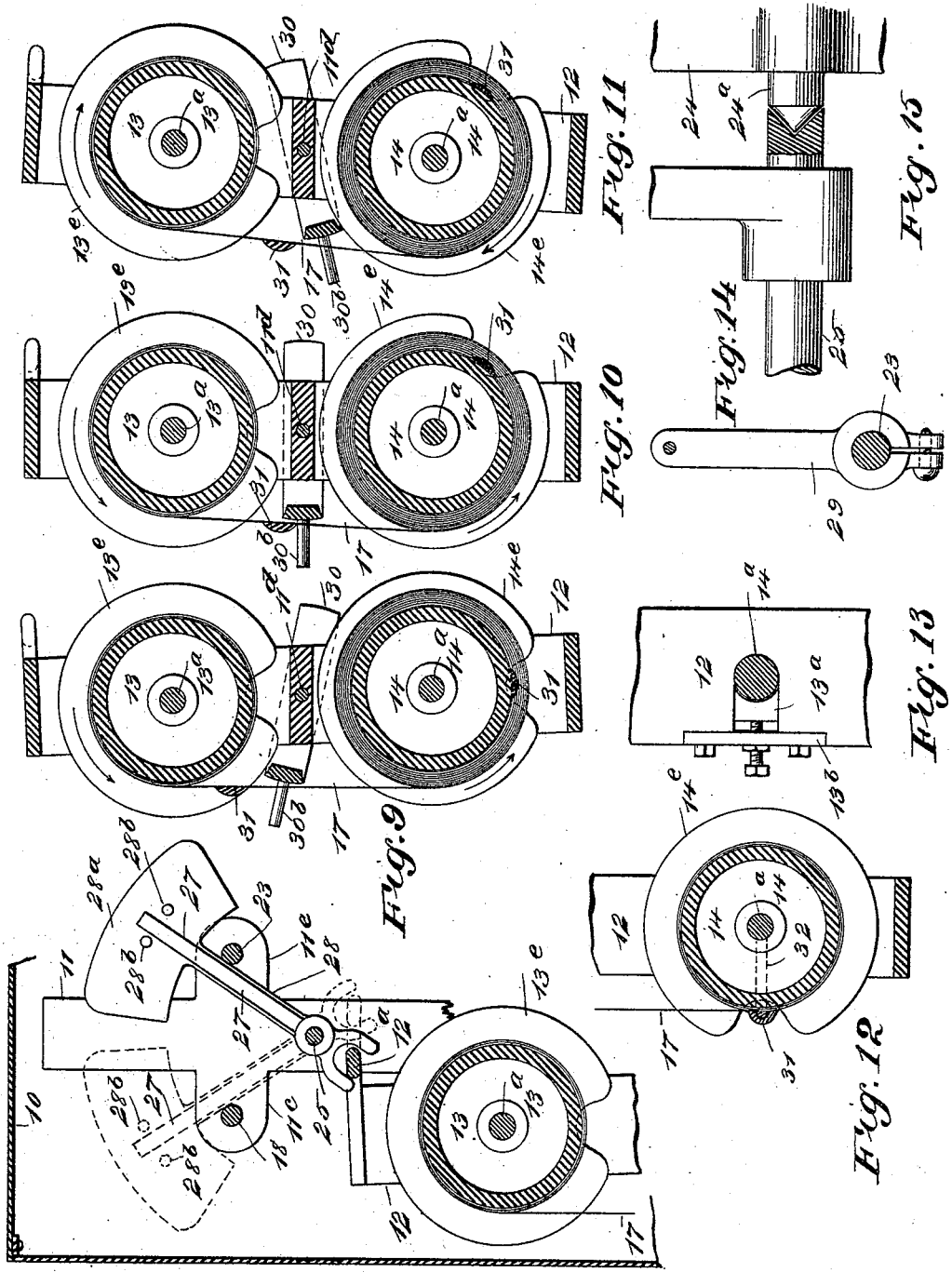
WITNESSES:
Johua Bergstrom
Wm P Patton
INVENTOR
W. T. Shirley
BY
Munn &Co
ATTORNEYS.

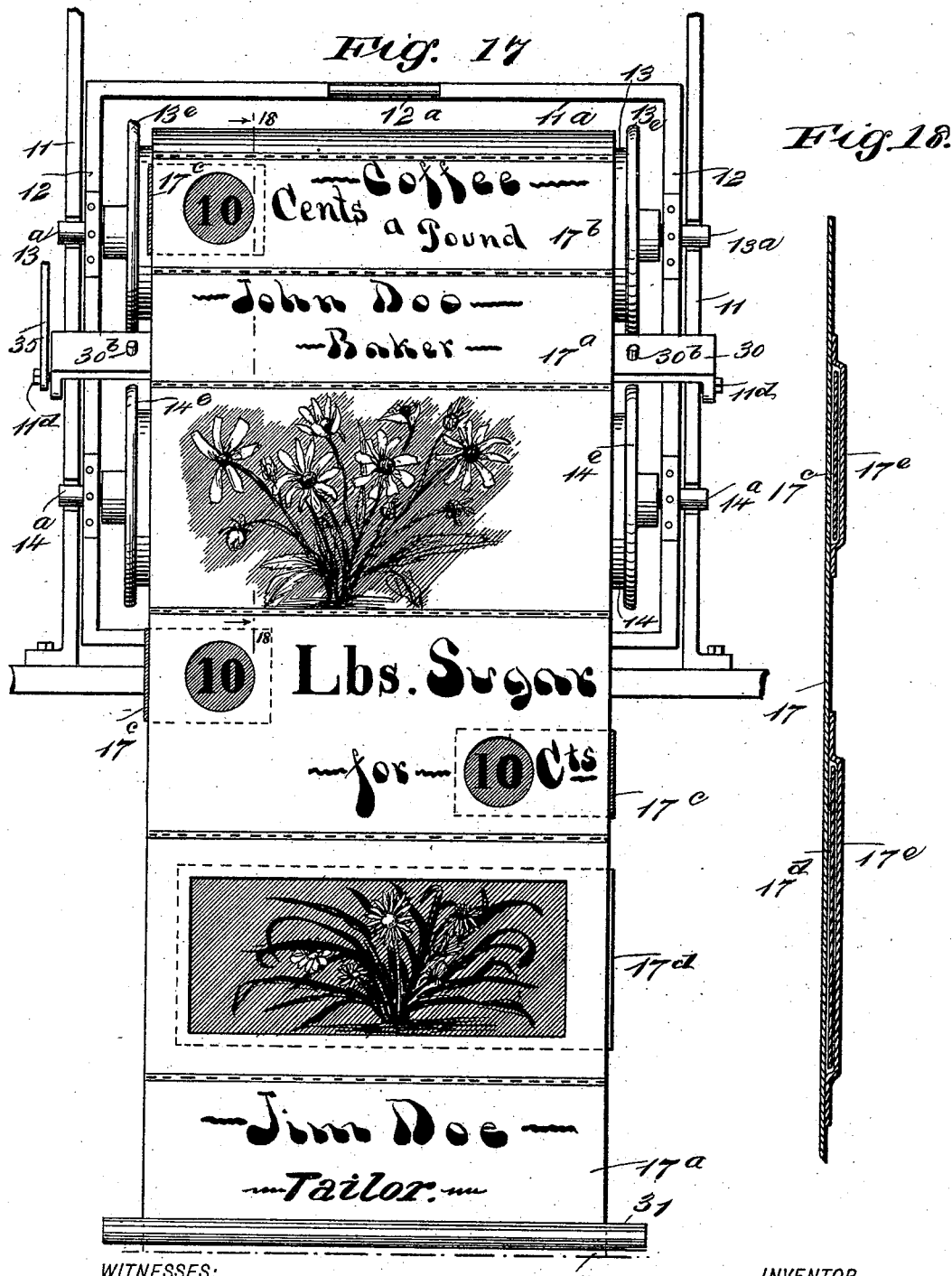

UNITED STATES PATENT OFFICE.

WILLIAM T. SHIRLEY, OF ST. ELMO, TENNESSEE.

ADVERTISING-MACHINE.

SPECIFICATION forming part of Letters Patent No. 528,814, dated November 6, 1894.

Application filed March 30, 1894. Serial No. 505,719. (No model.)

*To all whom it may concern:*

Be it known that I, WILLIAM T. SHIRLEY, of St. Elmo, in the county of Hamilton and State of Tennessee, have invented a new and useful Improved Advertising-Machine, of which the following is a full, clear, and exact description.

This invention relates to improvements in mechanical devices for the continuous display of advertising cards or equivalent mediums for advertising purposes, and particularly to a class of such machines as exhibit a series of advertisements on a longitudinally moving sheet of canvas or other flexible material.

The object of my invention is, to provide a novel, power-driven, compact and simple mechanical device, which will be adapted to move a display sheet in one direction of travel until all the advertisements have been exhibited, and then reverse the direction of travel for the sheet, to display the same advertisements in reversed order.

To this end, my invention consists in the construction and combination of parts, as is hereinafter described and claimed.

Reference is to be had to the accompanying drawings, forming a part of this specification, in which similar figures of reference indicate corresponding parts in all the views shown.

Figure 1 is a front view of the improved device with its case in section. Fig. 2 is a partly sectional end view, on the line 2—2 in Fig. 1. Fig. 3 is an end view of parts, and the case in section, on the line 3—3 in Fig. 1. Fig. 4 is a detached view of connected parts, taken opposite the arrow 4 in Fig. 1, showing their relative positions when other parts are adjusted as shown in Fig. 2. Fig. 5 represents the parts shown in Fig. 4, in changed adjustment. Fig. 6 shows the details of construction represented in Figs. 4 and 5, in different relative positions from those indicated in the figures mentioned. Fig. 7 represents another position for the details shown in Fig. 6. Fig. 8 is an enlarged sectional side view of parts, on the line 8—8 in Fig. 1. Fig. 9 is a sectional side view of details, on the line $x$—$x$ in Fig. 1. Fig. 10 is a view of parts shown in Fig. 9, indicating a changed position from that indicated in said figure. Fig. 11 is a sectional side view on the line $x$—$x$ representing the details shown in Fig. 10, in altered adjustment. Fig. 12 is a sectional end view of a lower main roller of the machine, a part of its frame support, and a clamp for the exhibiting sheet that is shown in part on the roller. Fig. 13 is an enlarged side view of a rocking frame in part, and a friction clamping box for the shaft of a main roller that is supported on this frame, taken opposite the arrow 13 in Fig. 1. Fig. 14 is a partly sectional side view of one of a pair of arms that are essential parts of the device, on the line 14—14 in Fig. 1. Fig. 15 is an enlarged side view of parts, the location of which is indicated by the arrow 9 in Fig. 1. Fig. 16 is a sectional side view of the casing of the device showing the working parts within, slightly altered in construction to project the flexible advertisement carrying sheet farther in advance of the machine frame. Fig. 17 is a front view of the flexible advertisement supporting sheet in part, pendent on its upper supporting roller, the rocking frame which sustains the upper and lower sheet supporting rollers, and a portion of the main frame of the machine, showing a changed construction of the sheet; and Fig. 18 is a transverse sectional view of the modified form of the flexible advertisement supporting sheet, taken on the line 18—18, in Fig. 17.

There is a case 10 of rectangular form, preferably used to inclose the working mechanism of the improved advertising machine, the front wall of which case is suitably apertured and glazed over the aperture to expose the advertisements as they successively appear before said window $10^a$ as indicated in Fig. 2. Within the case a main frame is erected, of a sufficient height to afford support for the working parts of the machine, which frame comprises two side standards 11, that are in flat plate form, and are joined above by the top piece $11^a$, the lower ends of the standards being secured upon the bottom wall of the case by screws.

On the front edges of the frame standards 11, two sets of forwardly-projecting jaws are formed or secured, these pairs of jaws being sufficiently spaced apart to serve as guides for other parts. Between and near to the standards 11, a rectangular rocking frame is introduced, which is composed of two upright members 12, that are joined together in parallel planes by the cross bars 12ᵃ. The rocking frame is supported in position by the trunnion bolts 11ᵈ that pass loosely through the standards 11 of the main frame, and are secured by their inner ends in the side pieces 12 of the rocking frame, these trunnions being located near the vertical and transverse centers of the side pieces, so that the frame will be adapted when oscillated, to project equally at its top and bottom beyond a perpendicular position. The height of the rocking frame is proportioned to the dimensions of the other parts, so that it will be adapted to afford support for the pair of main rollers 13, 14, that are each provided with a center shaft, as indicated at 13ᵃ, 14ᵃ. The longitudinally-extending shafts that are the axes of the rollers 13, 14, project at each end therefrom, of a sufficient length to pass through the rocking frame side pieces 12, and between the pairs of jaws 11ᵇ of the main frame, extending beyond the latter on one side to receive the driving wheels 15, 16. The journaled connections of the shafts that sustain the upper roller 13 and lower roller 14, are preferably constructed as shown in Fig. 13, each consisting of an open slot formed in the front edge of a side piece 12, which slots are curved at their bottoms to provide a half box bearing for an engagement therewith of the shaft journals, a loose box piece 13ᵇ being introduced in each slot over a shaft journal, which box pieces are held in place and caused to frictionally bear upon the shafts by the screw bolts that centrally penetrate the cap plates 13ᶜ, which are secured upon the front edges of the pieces 12, the adjustment of the pressure bolts on the loose box-pieces causing the latter to retard the rollers from to free a revoluble movement.

The rollers 13, 14, are properly separated and maintained in parallel planes by the means that have been described, their relative arrangement being such as will locate the top roller 13, above the center of the glazed aperture in the case 10, and the lower roller 14, below said center point, it being evident that the machine may be proportioned to allow any desired distance to intervene the rollers 13, 14.

On each end of the main rollers a flange is circumferentially projected beyond their peripheral surface, said flanges 13ᵉ, 14ᵉ, being provided to guide the travel of the flexible sheet 17, that is secured by its ends on the rollers 13, 14, a suitable length being provided for the sheet to adapt it to receive a desired number of advertisements 17ᵃ, on its outer surface, which are arranged in spaced order so as to successively appear at the aperture 10ᵃ, when the sheet is moved endwise. The preferred means for rotatably moving the main rollers 13, 14, consists of a main driving shaft 18, which is revolubly supported by its loose engagement with perforations oppositely formed to receive it in the bracket arms 11ᶜ, that project rearwardly from the standards of the main frame at a proper distance from the top plate 11ᵃ.

The main shaft 18, is restrained from longitudinal displacement by collars or equivalent means, and on its projected end portion which is above the projected ends of the roller shafts 13ᵃ, 14ᵃ, an elongated cylindrical drum 18ᵃ, is affixed, the shaft being further extended beyond said drum to pass through the side of the case and receive motion from any source of power, the direction of rotation being indicated by a curved arrow 1 near the main shaft in Fig. 2.

On the side of the main frame through which the roller shafts 13ᵃ, 14ᵃ, pass, and below the drum 18ᵃ, a strong journal stud 19, is secured by one end, so as to project a proper length for the reception of a rotatable pulley 19ᵃ, and friction wheel 19ᵇ, these cylindrical parts being rigidly connected at adjacent ends, and separated by a circumferential flange, as represented in Fig. 1, the pulley being outermost and both are held in place free to revolve by a washer and bolt at the end of the stud, or by other suitable means.

The journal stud 19, is located above the shaft 14ᵃ, and below the center support 11ᵈ of the rocking frame. Above the journal stud 19, another journal stud 20, is projected in a like manner from the standard of the main frame, for the rotatable support of another integral friction wheel and pulley as shown at 20ᵇ and 20ᵃ, the pulley and friction wheel last mentioned being nearer the frame standard than the wheel and pulley 19ᵃ, 19ᵇ.

An endless driving belt 21, is placed on the drum 18ᵃ, and pulley 20ᵃ, in a taut condition, and outside of said belt the crossed driving belt 22, is placed upon and extended between the drum 18ᵃ, and lower loose pulley 19ᵃ, and so strained that it will be adapted to transmit rotary motion from the drum to said pulley.

On the end portions of the roller shafts 13ᵃ, 14ᵃ, that are extended through the main frame standard, the large friction wheels 15, 16, before mentioned, are secured, these being respectively located in the same vertical planes with the smaller friction wheels 19ᵇ, 20ᵇ, so that a rocking movement of the journaled frame on the standards 11, will be adapted to cause a frictional engagement of the paired friction wheels 16, 20ᵇ, and 15, 19ᵇ, alternately. It will be seen that if the lower friction wheel 15 is thrown into contact with the wheel 19ᵇ, the rotation of the main shaft 18, in the direction of curved arrow 1, will move the lower and upper rollers 14, 13, in the direction represented by the curved arrows 2, the rotatable movement of the upper roller being effected by draft strain applied to the sheet 17, that is wrapped on the lower roller when such an adjustment is produced, the sheet then moving in the direction of the arrow 3, shown in Fig. 3.

If the rocking frame that supports the main rollers 13, 14, is vibrated so as to press the upper large friction wheel 16, into contact with the smaller friction wheel 20$^b$, the direction of revoluble movement for the upper roller 13 will be reversed, and it will be caused to wrap the sheet 17, upon its exterior, thereby moving the portion of said sheet, that extends between the rollers, in an upward direction.

The mechanism provided to automatically change the direction of rotation for the main rollers 13, 14, will now be explained. On the upper portion of each standard 11, opposite the bracket arms 11$^c$, similar arms 11$^e$, are forwardly projected, these being perforated near their outer ends in a plane parallel with the axis of the main shaft 18, the arms 11$^e$, affording bearings for the rotatable counter-shaft 23, which projects beyond one standard that is nearest the drum 18$^a$, for the reception of a spur-gear wheel 23$^a$, which is mounted on and secured to the projected shaft end having running clearance from the outer surface of the standard as indicated in Fig. 1. A spur gear wheel 18$^b$, is secured on the driving shaft 18, between the inner end of the drum 18$^a$, and the side of the frame standard 11, so as to have a toothed engagement with the similar spur wheel 23$^a$, the geared connection of these wheels causing the counter-shaft to revolve toward the main shaft. On the lower side of the top plate 11$^a$, at a proper distance from the standards 11, a hanger arm 24, is secured by its laterally projected foot-flange, the arm depending midway between the main shaft 18, and counter-shaft 23, projects a suitable length below said shafts, avoiding contact with the top bar 12$^a$, of the rocking frame. A horizontal hub is formed on the lower end of the hanger arm 24, that is axially perforated to receive an end portion of a spindle 24$^a$, the engaged portion of the cylindrical spindle being adjustably secured in the hub by set screws so as to permit the spindle to be shifted endwise if this is desired. The outer end of the spindle 24$^a$, is cone pointed as represented in Fig. 15. A rock shaft 25, is provided, which is cylindrical and has its inner end cupped to engage with the cone point of the spindle 24$^a$, the other end of the rock shaft being journaled in the frame standard 11, toward which it is projected. The rock shaft end portion that loosely engages with a suitable bearing in the frame standard as indicated in Fig. 1, is sufficiently extended outside of the standard to receive the perforated hub end of a tilting arm 26, that is secured thereto, the main portion of the straight rectangular body of said arm being upwardly projected. The rock shaft 25, is threaded on its body inside of the journal that engages with the standard 11, and on said threaded portion a nut is secured, a loose collar being placed on the shaft between the nut and standard so that an adjustment of the nut will produce proper frictional contact of the collar on the standard to prevent a looseness of the rock shaft. The spindle 24$^a$, projects far enough from the hanger arm to afford a journaled support for a tumbling lever 27. On the rock shaft 25, a straight piece 28, is firmly affixed by the hub on its lower end, the upwardly projecting body terminating above in a heavy arch shaped enlargement or gravity block 28$^a$, the entire part being preferably termed a gravity lever. On the side of the block 28$^a$, that is adjacent to the tumbling lever 27, and near the upper end of the latter, two similar tripping fingers 28$^b$, are projected therefrom, at such a distance apart as will permit these fingers to loosely embrace the sides of the tumbling lever, as shown in Figs. 1 and 8. Two similar tripping arms 29, are oppositely secured by their lower ends on the main shaft 18, and counter-shaft 23, by providing each arm with a clamp on its hub, that is adapted to compress the walls of the latter, as indicated in Fig. 10, so that the tripping arms can be set at any desired point with relation to each other and parts they are to move. The lower end of the tumbling lever 27, is furcated in parallel with the top bar of the rocking frame, which bar 12$^a$ is suitably formed at a point opposite the tumbling lever to receive its forked end that projects sufficiently below the rock shaft to permit such a loose engagement to be effected. From the tripping arm 29, near their upper ends, adjustable tappet bolts 29$^a$, are laterally projected, one from each arm, said bolts being designed to impinge with their ends that approach the gravity lever 28, the wing plates 28$^c$, that are oppositely secured on the front and rear edges of the heavy block that is the upper part of the lever named, this contact being effected when the parts are relatively adjusted as will be explained. For the proper operation of the machine the longitudinal center lines of the lever 28, and arm 26, should lie in the same plane. A vibratile frame is furnished, consisting of a transverse bar 30, extending across the standards 11, having limbs 30$^a$, at the ends which loosely embrace the standards so as to permit their transversely perforated bodies to be loosely engaged by the trunnion bolts 11$^d$, which afford support for the rocking frame of which the parts 12, 12, are side pieces. The transverse bar 30, is forwardly extended by its supporting limbs, a sufficient distance to permit it to have a loose contact of its convex front face with the rear surface of the portion of the flexible sheet 17, that extends uprightly between the rollers 13, 14, and afford support therefor, the degree of projection permitting the bar to vibrate from a horizontal plane, up or down a limited degree, and on the outer side of the bar 30, two pins 30$^b$, are projected at points near the ends of the rollers 13, 14. There are two similar pusher bars 31, secured transversely on the flexible sheet 17, one near each end, these pieces having such a length as will allow them to extend beyond the edges of the sheet an equal degree and cross the end flanges of the rollers 13, 14, which flanges are suitably notched for the introduction of the ends of the pusher bars as indicated in the sectional diagrammatic views, Figs. 9 to 11, inclusive. The pusher bars 31, are firmly attached upon the outer surface of the flexible sheet 17, at a proper distance from the terminals of the sheet, which latter may be screwed upon the rollers or be otherwise fastened thereto.

The flexible sheet 17 is wrapped a few turns at each end upon the rollers it is secured upon, and these wrapped portions which take the strain from the fastenings at the terminals of the sheet, may be prevented from unwrapping by a spring clamp 32, that is provided for each roller, the construction of which clamps is indicated in Fig. 12, each being composed of a staple loop the limbs of which are secured upon the roller shaft, and the cross bar of the loop made to press upon the wrapped sheet, so that these wrapped portions which do not have advertisements on them are retained in a close rolled condition.

If the spring clamps 32, are employed, it will be best for effective service, that the pusher bars 31, be longitudinally grooved on the faces that are affixed to the sheet 17 which is embedded in the grooved bars. This will permit the pusher bars to bear closely and receive the cross bars of the spring clamps within their grooves as shown in Fig. 12.

One limb $30^a$, of the vibratile frame, is projected an equal distance from the trunnion bolt $11^d$, on which it is sustained, this limb being located below the tilting arm 26, as shown in Fig. 3. A guide block 33, is secured on the main frame standard 11, below and near to the hub of the tilting arm 26, said block being of sufficient length and thickness to adapt it to receive and loosely support the two similar upright slide bars 34, $34^a$, which pass through vertical holes formed for their accommodation in the block near its ends, and are thus sustained in parallel with each other. The lower ends of the slide bars 34, $34^a$, are pivoted to the upper ends of two similar link plates 35, which are flat strips of a suitable length to permit their lower ends to be loosely secured upon the transverse limb $30^a$, that is below the guide block. The lengths of the slide bars 34, $34^a$, and that of the links 35, should be so proportioned, that the slide-bars will be projected a proper distance above the guide block 33, at all times, and their bodies lie in the same vertical plane with the tilting arm 26, so that an upward movement of the slide-bars alternately effected, will cause them to successively impinge the side of the tilting bar if it is inclined to permit such a contact.

The edges of the heavy block $28^a$, whereon the wing plates $28^c$, are affixed to project over edges of said block that are nearest to the tripping arms 29, are downwardly and inwardly inclined an equal degree. The wing plates have the same inclination as the edges of the block they are affixed upon, their lower edges being equally distant from the center of the rock shaft 25, so that the positions given to the tappet bolts $29^a$ adapt said bolts to clear the lower edges of the wing plates when the machine is in operation, and the gravity lever 28, is rearwardly or forwardly inclined to rest on the main shaft 18, or counter-shaft 23.

The operation of the advertising machine will now be explained. Assuming that the parts are in the relative positions indicated by Figs. 1, 2 and 3, the flexible sheet 17, will then be almost entirely wrapped upon the lower main roller 14, as indicated in Figs. 9, 10, and 11, the pusher bar on the end portion of the sheet that is nearly unwrapped from the upper main roller being removed from the notched places in the end flanges of said roller.

The disposition of the flexible sheet 17, as explained, necessitates the arrangement of other parts as follows: The gravity lever 28, and tumbling lever 27, are rearwardly inclined to rest upon the main shaft 18, and it will be seen that the main shaft and counter-shaft 23, limit the degree of vibration that may be given to the parts mentioned. When the tumbling lever is thrown rearwardly, the upper portion of the rocking frame will be projected forwardly as represented in Figs. 2 and 9. The direction of rotation to be given to the main shaft 18, indicated by the curved arrow 1, in Fig. 2, will draw the free pusher bar 31, that is above the pins $30^b$, down upon said pins, which will move the rear slide bar $34^a$, upwardly from the position indicated in Figs. 3 and 4. The continued movement of the slide-bar $34^a$, in an upward direction, pushes the tilting arm 26, correspondingly, so that it will assume an inclined plane nearer a vertical position as shown in Fig. 5. The difference in the curved paths, described by the tappet bolt end that is projected from the tripping arm on the shaft 18, and the upper end of the tilting arm 26, when both are rocked in a forward direction, will cause said bolt-end to impinge the outer surface of the wing plate at the rear edge of the gravity lever, and transmit the motion of the shaft 18, to the gravity lever, thereby rocking it and the loosely connected tumbling lever 27 into an upright position. The impetus given to the heavy headed lever 28, tends to throw it over toward the front, where it is arrested by contact with the counter-shaft 23, these successive movements being clearly defined in the diagrammatic views 4, 5, 6 and 7, the relative positions assumed by the rocking frame 30, $30^a$, being represented in Figs. 9, 10 and 11. When the rocking frame is rearwardly inclined, the friction rollers driven by the crossed belt 22, will be separated, and the upper friction rollers that are driven by the uncrossed belt 21, will have a frictional engagement, which will reverse the rotary movement of the rollers 13, 14, and wrap the sheet 17, on the upper roller, until the sheet is sufficiently removed from the lower roller to cause the pusher bar on the lower end portion of the sheet, to impinge the pins 30ᵇ, from below. This will rock the vibratile frame bar 30, upwardly, and so adjust the slide bars that the front slide bar 34 will rise and throw the tilting arm 26, rearwardly, thus repeating the operation of changing the direction of progressive movement for the sheet in front of the rollers, as long as the machine is in motion.

The side view of parts shown in Fig. 16, represents the rollers 13, 14, journaled one above the other near the center of width in the main frame side standards 11, the latter having two parallel arms 11ᵉ, formed on each at their front edges, which arms project forwardly a suitable length to adapt them to afford support for the supplementary rollers 11ᶠ, that have their journaled ends 11ᵍ, loosely engaged with opposite perforations in the arms. The flexible sheet 17 is extended forwardly and has contact with the rollers 11ᶠ, as shown in Fig. 16, and is thereby sustained in a taut condition opposite the glazed aperture 10ᵃ of the case 10, it being necessary that the casing have increased dimensions between its front and rear walls when this construction is adopted.

It will be noticed, that when the parts are constructed as shown in Fig. 16, the arms 30ᵃ of the vibratile frame having the transverse bar 30, are increased in length forwardly so as to permit the pins 30ᵇ, which project from the bar 30, to extend in advance of the flexible sheet 17, near each side edge, in a manner similar to that indicated in Figs. 2 and 3, which have been already described, thereby permitting the strip 31, to impinge the pins as the flexible sheet is moved, and reverse the direction of progressive movement of the latter.

An advantageous feature of construction for the convenient exchange of advertisements that are to be displayed on the sheet 17, consists in the formation of transverse pockets 17ᶜ, on the inner surface of said sheet as shown in Figs. 17 and 18, of the drawings, the material for the pockets being flexible so as to avoid impeding the free movement of the sheet on the rollers 13, 14. The pockets mentioned, are open at one side edge of the sheet 17, to permit the insertion within them of the advertising slides 17ᶜ, that are exposed at their front faces through apertures of proper dimensions formed in the sheet 17, opposite the pockets 17ᶜ, said slides being formed of a suitable pliable material that is adapted to conform to the curved surface of the rollers when the sheet is wrapped on them. The slides 17ᶜ may be alternated with ornamental pictures, and at intervals fixed advertising cards such as 17ᵃ, may be placed on the sheet for display of their legends periodically through the glazed aperture 10ᵃ of the case 10.

It is claimed for this improved advertising device, that it will if well constructed, operate in a reliable manner for a considerable period of time without attention, and as it is automatic with regard to reversal of motion, its manner of operation is adapted to attract attention, and serve as a first class advertising medium.

It will be evident that a change in proportion of the parts, may be made without affecting the results to be attained, and that any suitable materials may be utilized in the construction of the improvement. Furthermore, it is contemplated to use sprocket chain gearing in some instances to take the place of the belts 21, 22, which will not materially alter the operation of the device, but may be preferred in lieu of the friction wheels and belts that have been shown and described, as one means for the actuation of working parts of the machine.

Having thus fully described my invention, I claim as new and desire to secure by Letters Patent—

1. The combination with a supported rocking frame, rollers thereon, and a flexible sheet carried by said rollers, of a roller-rotating mechanism, and a co-acting frame rocking device operated by said sheet, substantially as described.

2. The combination with a pivotally supported frame, and two spaced rollers thereon, of a flexible sheet fast at its ends on the rollers, and mechanism arranged to alternately move the rollers and sheet in opposite directions when tripped by projections on the sheet, substantially as described.

3. The combination with a frame supported to rock from a vertical plane, two spaced rollers thereon, and a flexible sheet, of mechanism arranged to reverse the direction of rotative movement in the rollers when the frame is rocked, substantially as described.

4. The combination with a frame supported to rock from a vertical plane, two spaced rollers journaled thereon, a flexible sheet secured by ends on the rollers, and mechanism arranged to alternately change motion in the rollers when the frame is rocked, of a device actuated by the moving sheet that is adapted to periodically rock the frame, substantially as described.

5. The combination with a case and a main frame, of a rocking frame pivoted therein, two spaced main rollers, a flexible sheet on said rollers, and mechanism that moves the rollers and sheet alternately in opposite directions, changing said movement when the roller bearing frame is rocked, substantially as described.

6. The combination with a case and a main frame, of a rocking frame pivoted in the main frame, a roller supported flexible sheet in the rocking frame, and mechanism moved by the sheet which is adapted to rock the roller frame, substantially as described.

7. The combination with a main frame, of a rocking frame pivoted in the main frame, two spaced rollers on shafts journaled in the rocking frame, mechanism engaging the shaft ends and arranged to change rotation of the rollers and direction of movement for the sheet as the frame is rocked, and a device moved by the sheet that is adapted to rock the roller frame, substantially as described.

8. The combination with a main frame, a rocking frame therein, two spaced rollers on the rocking frame, and a flexible sheet fast by ends on the rollers, of gearing arranged to change the direction of rotation in the rollers as the frame is rocked, a vibratile frame on the main frame, transverse bars on the sheet adapted to periodically engage the vibratile frame oppositely, and mechanism actuated by the vibratile frame and arranged to move the rocking frame, substantially as described.

9. The combination with two horizontally supported, spaced rollers on a rocking frame, a flexible sheet secured by ends on the rollers, and mechanism arranged to rotate, and periodically change the direction of rotation for the rollers when the frame is rocked, of a frame rocking device, comprising two transverse bars on the sheet near its ends, a vibratile frame oppositely moved by said bars, two slide bars actuated by the vibratile frame, a rock shaft above the rocking frame, a tilting arm alternately engaged by the slide bars, a gravity lever on the rock shaft, a tumbling lever loosely secured to the gravity lever and having a forked connection with the top bar of the rocking frame, and a device moved by the roller actuating mechanism and adapted to rock the gravity lever, substantially as described.

10. The combination with a main frame, an upright pivoted rocking frame thereon, two spaced horizontal main rollers on shafts journaled in the rocking frame, friction wheels on projected ends of said shafts, a flexible sheet fast at its ends on the rollers, transverse bars on the sheet, and a frame rocking device actuated by the transverse bars, of a main shaft, a drum thereon, friction wheels on projected ends of the main roller shafts, smaller friction wheels having pulleys on their ends, and rotatably sustained to alternately engage with the friction wheels on the main rollers as the frame is rocked, and belts arranged to rotate the smaller friction wheels in opposite directions, substantially as described.

11. The combination with a main frame and a rocking frame, of two main rollers thereon, two supplementary rollers rotatably supported on projecting arms on the main frame, a flexible sheet engaging the main rollers and supplementary rollers, and power driven mechanism arranged to rotate the main rollers and adapted to change the direction of their rotary movement, substantially as described.

WILLIAM T. SHIRLEY.

Witnesses:
FRANK P. SWICK,
HENRY × WILLIAMS.
     his
     mark